US012311566B2

(12) United States Patent
Neeb et al.

(10) Patent No.: US 12,311,566 B2
(45) Date of Patent: May 27, 2025

(54) SUPPORT FOR CUTTING A LINEAR PRODUCT

(71) Applicant: EXCELSIOR INC., Guelph (CA)

(72) Inventors: Timothy Howard Neeb, Guelph (CA); Tristan Zimmermann, Guelph (CA)

(73) Assignee: EXCELSIOR INC., Guelph (CA)

( * ) Notice: Subject to any disclaimer, the term of this patent is extended or adjusted under 35 U.S.C. 154(b) by 0 days.

(21) Appl. No.: 18/144,498

(22) Filed: May 8, 2023

(65) Prior Publication Data

US 2023/0271341 A1 Aug. 31, 2023

Related U.S. Application Data

(63) Continuation of application No. 17/225,662, filed on Apr. 8, 2021, now Pat. No. 11,642,807.

(51) Int. Cl.
*B26D 7/02* (2006.01)

(52) U.S. Cl.
CPC .................................... *B26D 7/02* (2013.01)

(58) Field of Classification Search
CPC .................................. B26D 7/02; B26D 7/20
See application file for complete search history.

(56) References Cited

U.S. PATENT DOCUMENTS 7,631,757 B2 * 12/2009 Petricca ............. B65D 77/2044 206/352
2003/0221533 A1 * 12/2003 Elia .......................... B26D 7/20 83/347

OTHER PUBLICATIONS

Meriam Webster; definition of the word contour (Year: 2024).*

* cited by examiner

*Primary Examiner* — Bayan Salone
(74) *Attorney, Agent, or Firm* — Gowling WLG (Canada) LLP

(57) ABSTRACT

A support for enabling cutting of a linear product, such as an eavestrough debris guard, is disclosed. The eavestrough debris guard has a top, two sides, a bottom, and a non-linear profile. The support includes a contoured top complementary to a bottom portion of the non-linear profile. The support includes a plurality of surfaces extending from the contoured top positioned to engage with the two sides of the linear product. The support includes a plurality of contoured portions each coupled to one of the surfaces positioned to engage with the top of the linear product. The support includes a gap passing through the contoured top and the plurality of surfaces shaped and dimensioned to allow passage of at least a portion of a cutting tool.

12 Claims, 10 Drawing Sheets

SUPPORT FOR CUTTING A LINEAR PRODUCT

CROSS-REFERENCE TO OTHER APPLICATIONS

The disclosure is a continuation of U.S. application Ser. No. 17/225,662 filed Apr. 8, 2021, now U.S. Pat. No. 11,642,807 which is hereby incorporated by reference.

FIELD

The disclosure is generally directed at supports for enabling cutting, and more specifically to a support for enabling cutting of a linear product.

BACKGROUND

When individuals try and make a cut through an item, there is a need to secure the item prior to cutting so that the item does move during the cutting process. If the item moves, there may be damage to the item or an error in the cut where the cutting process has to be repeated, usually with a replacement item. More seriously, injury may occur to the individual doing the cutting if the item moves during the cutting process.

To protect the foundations of buildings, eavestroughs, also known as gutters, are installed under the edge of a roof to collect and manage the flow of rainwater off of the roof and away from the base of the building. Leaves, pine needles, and other debris dropped onto the roof can collect in the eavestroughs, this in turn can clog the eavestroughs and downspouts causing the rainwater to overflow the eavestrough and collect around the base of the building. Debris guards can be installed on eavestroughs to reduce the amount of or prevent debris from entering the eavestrough while still allowing the water to flow through.

As every building has a custom layout of eavestrough to match the shape of the roof line, the installation of the debris guard must be customized on site to match the size and shape of the building eavestrough layout. Proper and efficient installation of any system is of the highest importance to overall performance, cost and longevity. Eavestrough debris guards perform optimally when all of the adjoining sections of the debris guard are cut straight and to appropriate dimensions. The debris guard may be cut to size with a hand saw and minimal tools, however this can make it difficult to get an accurate and completely straight cut.

Therefore, there is an unmet need in the art for a novel support for cutting a linear product with improved ease, efficiency, and accuracy.

SUMMARY

The disclosure is directed at a support for enabling cutting of a linear product. In select embodiments, the disclosure is directed at a support for enabling cutting of an eavestrough debris guard.

In select embodiments, the present disclosure relates to a support for enabling cutting of a linear product, the support including a contoured top having a profile complementary to a bottom portion of the linear product. The support includes a pair of sidewalls extending from the contoured top, each sidewall shaped to receive the linear product. The support includes a plurality of clips positioned within the sidewalls to engage with a top of the linear product to lock the linear product in place in a first position and to disengage with the top of the linear product to release the linear product in a second position. The support includes a set of gaps within the contoured top and the pair of sidewalls, the set of gaps shaped and dimensioned to receive at least a portion of a cutting tool.

In select embodiments, the plurality of clips extend from or are coupled to the contoured top. In select embodiments, at least one of the plurality of clips is movable in a direction towards and away from the linear product. In select embodiments, the at least one of the plurality of clips comprises a profile that mirrors one of the pair of sidewalls.

In select embodiments, the linear product is an eavestrough debris guard. In select embodiments, the pair of sidewalls are positioned opposite each other. In select embodiments, the support further includes a clamp wherein the clamp is rotatable between an engaged position and an unengaged position for holding the linear product in place in the engaged position. In select embodiments, the clamp is locked in the engaged position by one of the plurality of clips.

In select embodiments, the set of gaps is dimensioned to receive a blade of a manual saw. In select embodiments, the contoured top comprises at least one depression complementary to at least one extension of the linear product. In select embodiments, the contoured top comprises at least one protrusion complementary to a gap between extensions of the linear product. In select embodiments, the support further includes a plurality of fastening holes passing through the contoured top.

In select embodiments, the present disclosure relates to a method of supporting a linear product. The method includes engaging a bottom portion of the linear product with a contoured top of a support, the contoured top having a profile complementary a profile of the bottom portion of the linear product. The method includes receiving two sides of the linear product with a pair of sidewalls extending from the contoured top, and engaging a top of the linear product with a plurality of clips.

In select embodiments, engaging a top of the linear product with a plurality of clips includes engaging the top of the linear product with at least one movable clip. In select embodiments, the method further includes engaging a top of the linear product with a clamp by rotating the clamp from a disengaged position to an engaged position.

BRIEF DESCRIPTION OF THE DRAWINGS

The foregoing and other features and advantages of the disclosure will be apparent from the following description of embodiments thereof as illustrated in the accompanying drawings. The accompanying drawings, which are incorporated herein and form a part of the specification, further serve to explain the principles of the disclosure and to enable a person skilled in the pertinent art to make and use the invention. The drawings are not to scale.

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. Directional terms used within the specification are with respect to the way in which the figure is presented unless otherwise described. Furthermore, there is no intention to be bound by any expressed or implied theory presented in the preceding technical field, background, brief summary or the following detailed description.

Figure 1:
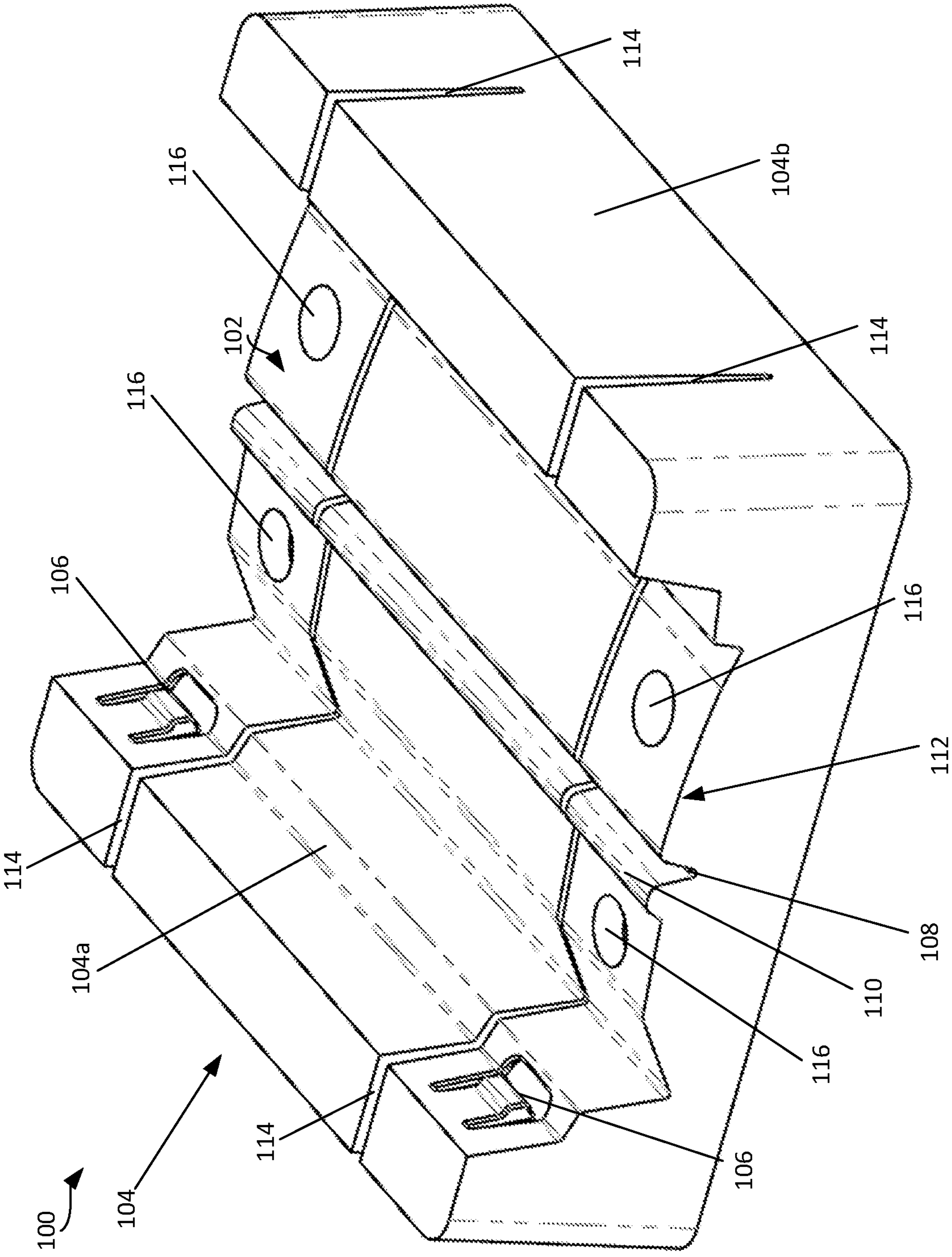
FIG. 1 is a top perspective view of a support for cutting a linear product according to an embodiment herein.

FIG. 1 is a top perspective view of a support 100 for cutting a linear product according to an embodiment herein. The support 100 includes a contoured top 102, a plurality of sidewalls 104 and a plurality of clips 106. The sidewalls 104 (which may be seen as sidewalls 104*a* and 104*b*) are located on opposite sides of the contoured top 102 and extend from the contoured top 102. The sidewalls 104 may include different sections which are angled with respect to each other to receive a linear product whereby a profile of the sidewall may be somewhat complementary with a side profile of the linear product.

As shown in FIG. 1, clips 106 are coupled to, mounted to, or integrally moulded to the sidewalls 104. Although not shown in FIG. 1, clips 106 are also coupled to, mounted to, or integrally moulded to the sidewall 104*b*. In the present embodiment, the clips 106 are integrated with a portion of the sidewalls 104, however in alternate embodiments, the clips may be coupled to the sidewalls 104, coupled to the contoured top 102, or otherwise coupled to part of the support 100.

Contoured top 102 includes a depression 108 and a protrusion 110 that, in the present embodiment, define a portion of a profile 112 of the contoured top 102. The profile 112 of the contoured top 102 is designed to receive a linear product that has a somewhat complementary profile, as will be discussed below. Depending on a design of the linear product, the contoured top 102 may include any number of depressions and protrusions.

Figure 2:
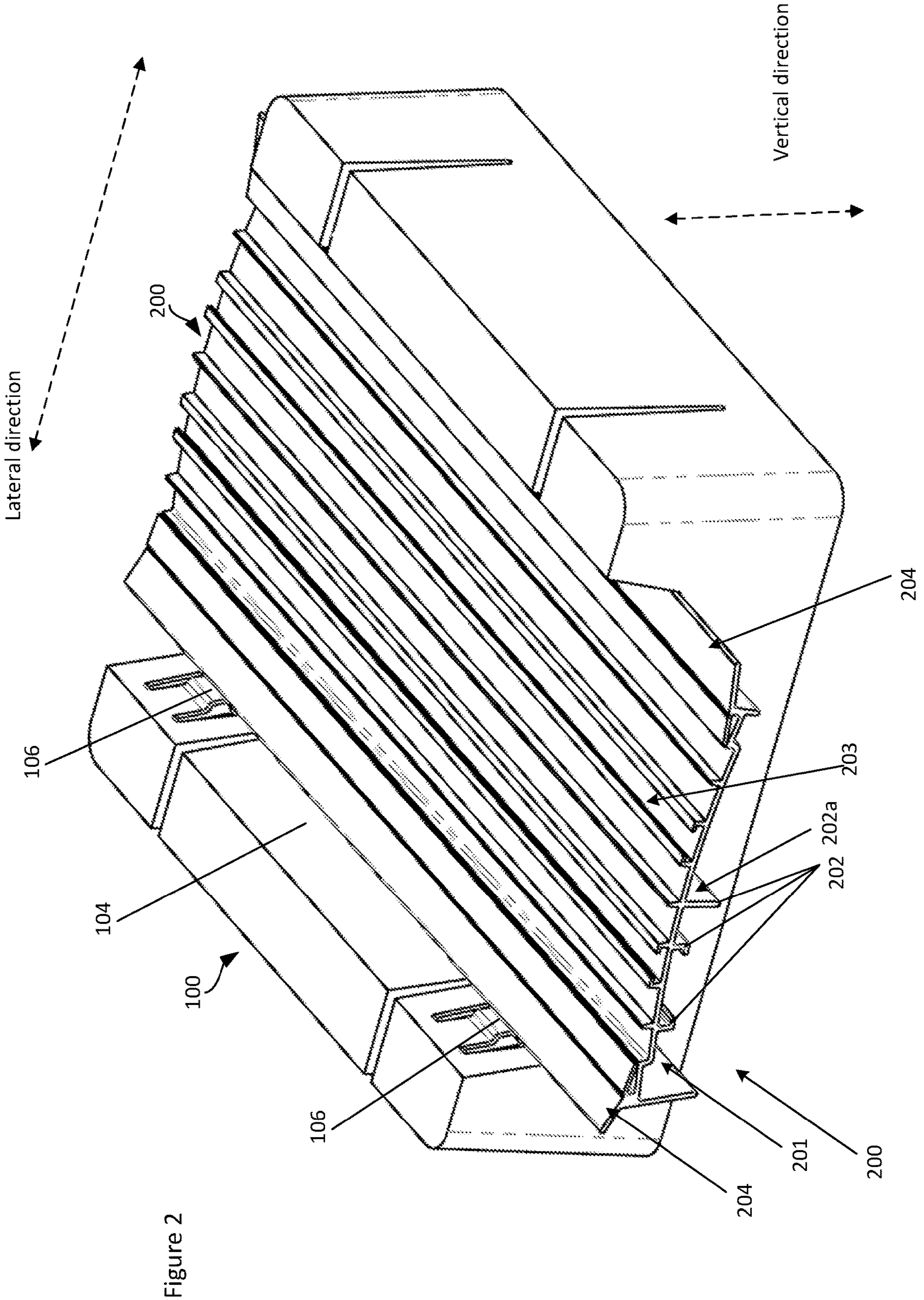
FIG. 2 is a top perspective view of the support of FIG. 1 coupled to a linear product.

The support 100 further includes gaps 114 for receiving and/or guiding a cutting tool, such as, but not limited to a saw blade, during a cutting process (as will be described in more detail below). The gaps 114 may be shaped and dimensioned to allow passage of at least a portion of the cutting tool, and have a depth to allow a through cut of the linear product. In other words, gaps 114 allow a cutting tool to cut entirely across the linear product. In some embodiments, the gaps 114 are shaped and dimensioned to allow passage of a blade of a manual saw, e.g. a hacksaw. In other embodiments, the gaps 114 may be dimensioned to allow passage of a blade of a handheld power tool. The support 110 may further include fastening holes 116 that may allow the support 100 to be fastened to another object, e.g. a surface, to stabilize the support 100 during cutting FIG. 2 is a top perspective view of the support of FIG. 1 coupled to, or receiving, a linear product 200. In the present embodiment, the linear product 200 is an eavestrough debris guard, such as disclosed in US Patent Application Publication No. 2020/0308839 entitled Eavestrough Debris Guard filed Mar. 25, 2020, which is hereby incorporated by reference. In other embodiments, the linear product may be a product other than an eavestrough debris guard where the linear product has a contoured shape. As a non-exclusive example, linear products may be manufactured by extruding a material through a die having a profile matching the desired profile of the linear product. Non-exclusive examples of materials from which linear products may be manufactured include plastic and/or metal, e.g. aluminum.

In some embodiments, the linear product 200 has a profile that does not vary (outside of manufacturing tolerances) along its linear (long) axis, however the profile is non-linear across the lateral and vertical axes of the linear product.

Linear product 200 includes a frame portion 201 that includes side portions 204 and a central portion 203 therebetween, the central portion 203 including a plurality of extensions 202. In the present embodiment, depression 108 is complementary to one of the extensions 202 (seen as extension 202*a*), while protrusion 110 is complementary to a gap between a pair of extensions 202. In one embodiment, in order to provide an improved fit between the linear product 200 and the support 100, the profile of the contoured top 102 is somewhat complementary to a profile of the bottom portion of the linear product 200. Somewhat complementary means that the profiles are somewhat similar without needing to be identical or perfectly match each other. In some embodiments, the profile of the contoured top 102 at least partially follows the contours of the bottom portion of the linear product 200.

Figure 3B:
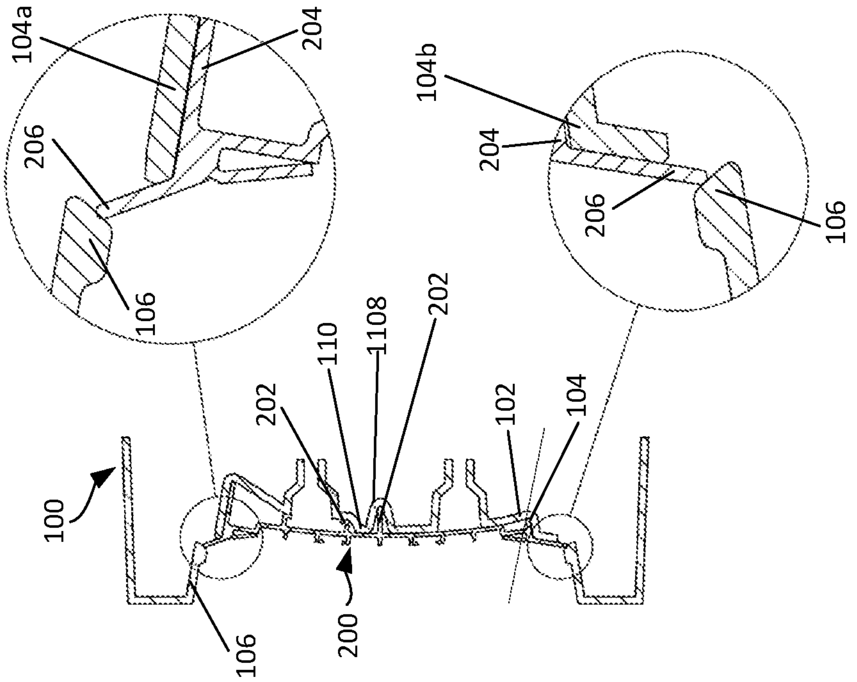
FIG. 3B is a side cross-sectional view of the support coupled to the linear product taken along line A-A of FIG. 3A.
Figure 3A:
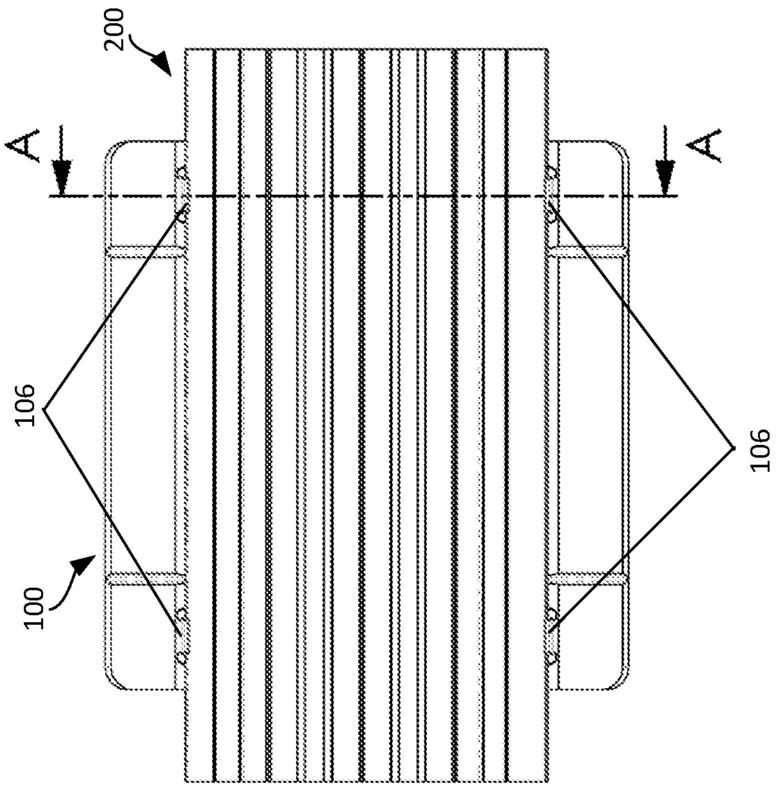
FIG. 3A is a top view of the support of FIG. 1 coupled to the linear product.

FIG. 3A is a top view of the support 100 coupled to the linear product 200. FIG. 3B is a side cross-sectional view of the support 100 coupled to the linear product 200 taken along line A-A of FIG. 3A. As shown in the magnified portions of FIG. 3B, the sidewalls 104 engage with the side portions 204 of the linear product 200 to reduce movement, such as in a lateral direction, of the linear product 200, especially during cutting. As discussed above, the profile or shape of the sidewalls 104 is designed to be somewhat complementary to the profile of the side portion 204. The sidewalls 104 allow the support 100 to securely hold or support the linear product 200 during cutting of the linear product 200. Also, as shown in the magnified portions of FIG. 3B, the clips 106 engage with a top portion 206 of the linear product 200 to reduce or eliminate vertical movement of the linear product 200. It is appreciated that vertical movement of the linear product 200 may be reduced even if only a portion of the clips 106 are in direct contact with the linear product 200, for example due to variations in the dimensions of either the support 100 or the linear product 200 within manufacturing tolerances, or due to bending of either the support 100 or the linear product 200.

In one embodiment, the clips 106 are made from a resilient material to allow some movement of the linear product 200, which may reduce the magnitude of forces applied to the linear product 200 as the linear product 200 is being cut. In alternative embodiments, the clips 106 may be rigid. In the present embodiment, support 100 includes four clips 106, however in alternative embodiments; the support may include any number of clips 106. In order to remove the linear product 200 from the support 100, the clip 106 may be depressed so that the linear product 200 can move past the clip 106 in a direction away from the bottom of the support 100.

Figure 4:
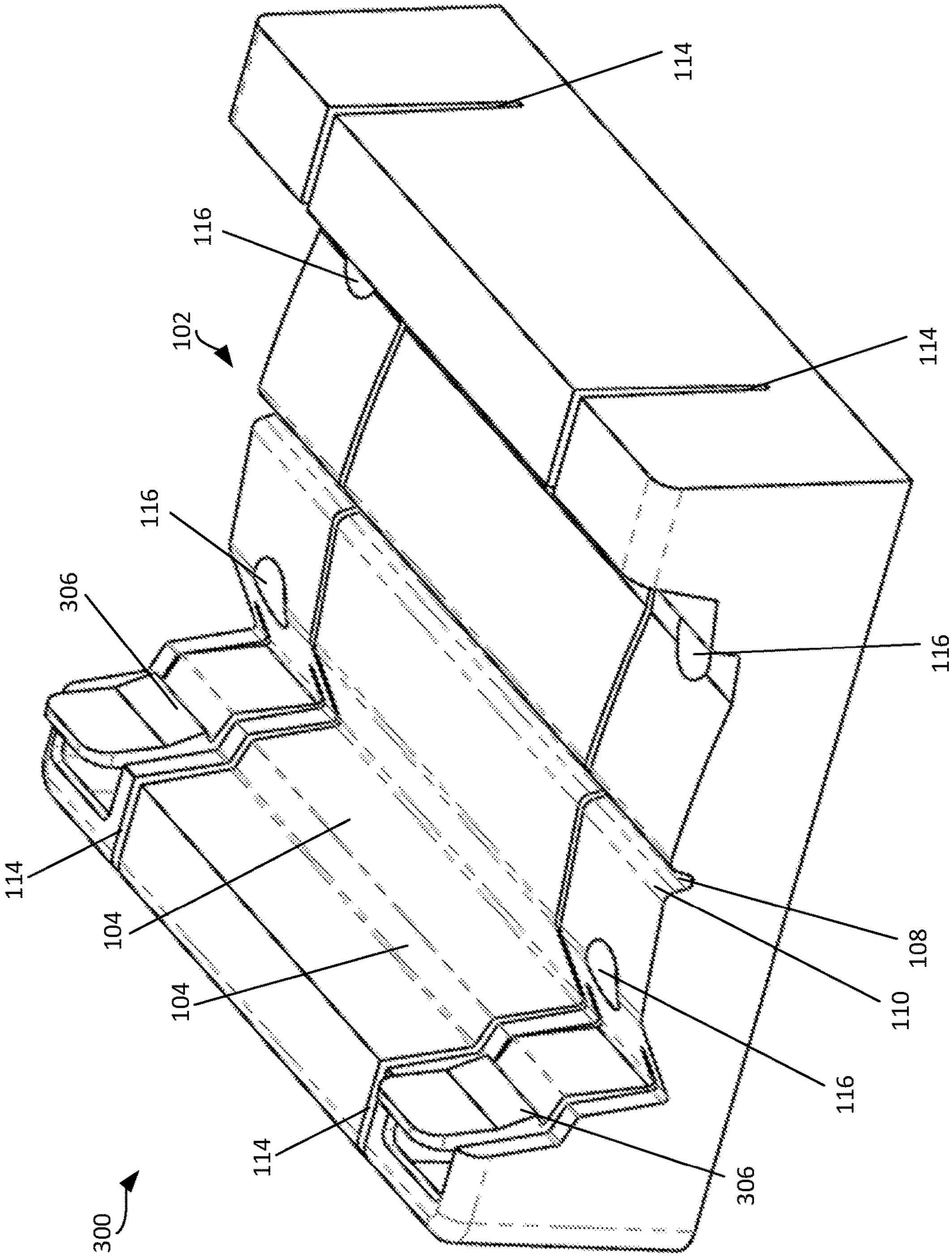
FIG. 4 is a top perspective view of another embodiment of a support for cutting a linear product.
Figure 5:
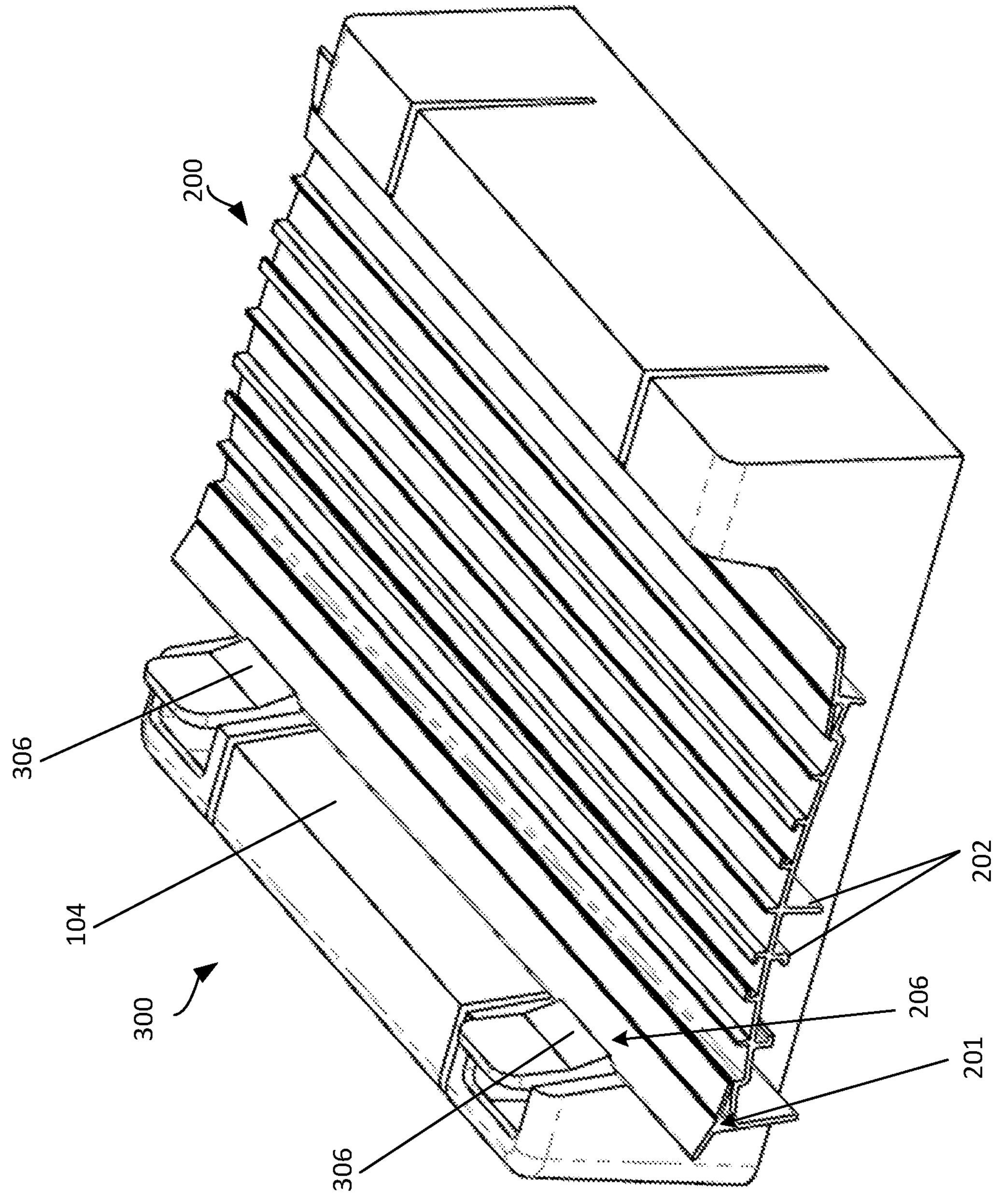
FIG. 5 is a top perspective view of the support of FIG. 4 coupled to a linear product.
Figure 6B:
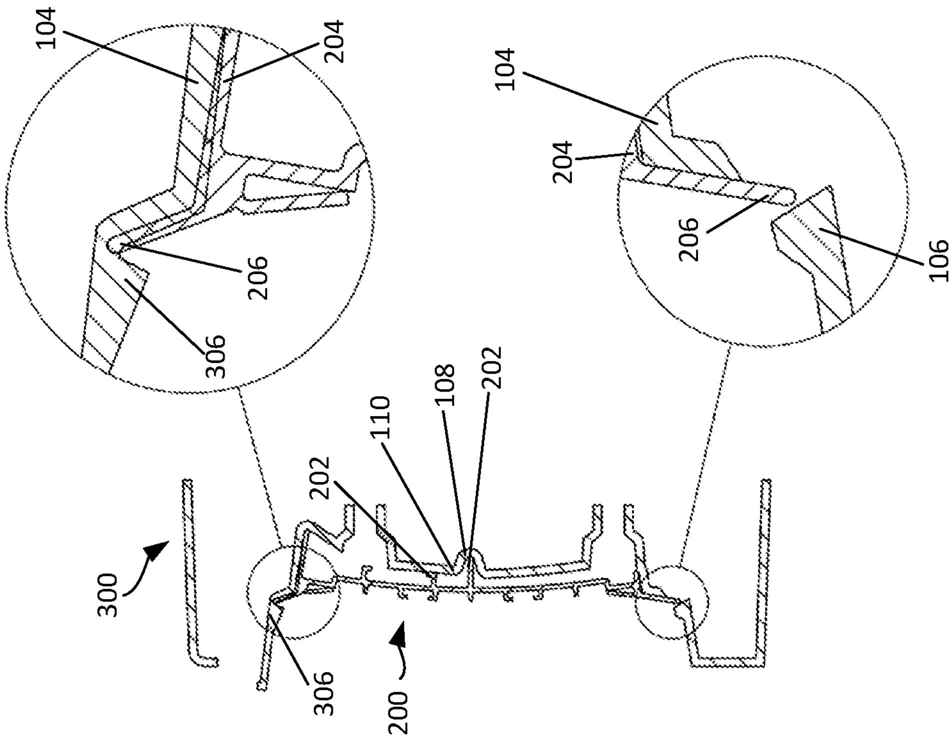
FIG. 6B is a side cross-sectional view of the support coupled to the linear product taken along line B-B of FIG. 6A.
Figure 6A:
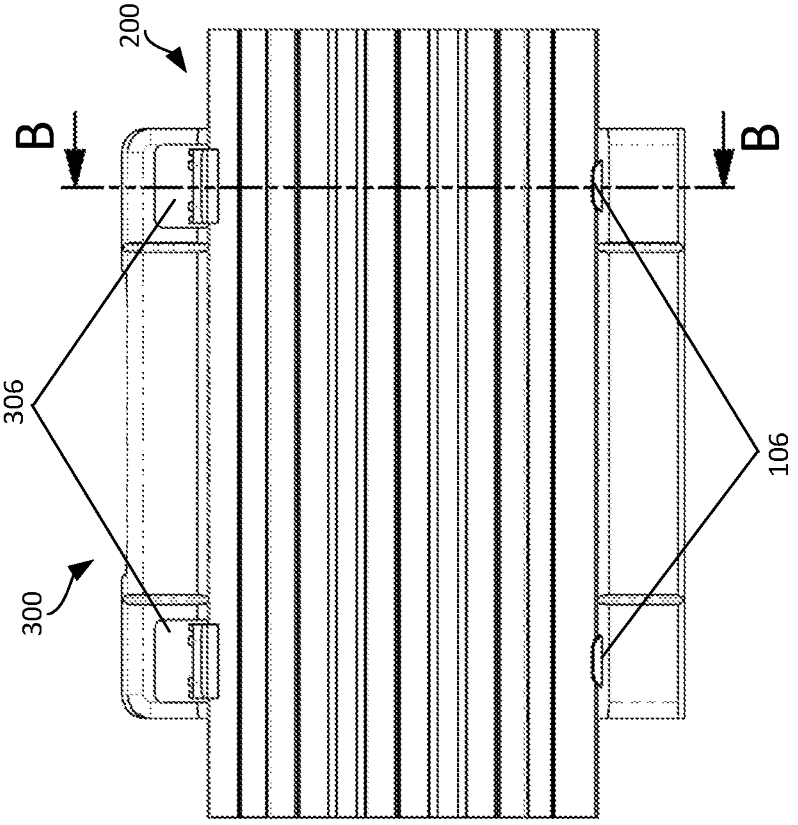
FIG. 6A is a top view of the support of FIG. 4 coupled to the linear product.

FIG. 4 is a top perspective view of another embodiment of a support 300 for cutting a linear product. FIG. 5 is a top perspective view of the support 300 coupled to a linear product 200. FIG. 6A is a top view of the support 300 coupled to the linear product 200 and FIG. 6B is a side cross-sectional view taken along line B-B of FIG. 6A. Support 300 is similar to support 100 whereby support 300 includes a contoured top 102, a plurality of sidewalls 104, a depression 108, a protrusion 110, gaps 114, and fastening holes 116.

In the current embodiment, the set of clips include movable clips 306 and clips 106. In the current embodiment, the movable clips are located on only one of the sidewalls with clips (similar to clips 106 of FIG. 1) integrated with the other of the sidewalls 104 although movable clips 306 may be located on both sidewalls 104 of the support.

Movable clips 306 are each coupled to, or extend from, the contoured top 102 and are movable in a direction approximately perpendicular to contoured top 102 or a central portion of the linear product. Each movable clip 306 includes a portion having a profile that at least partially mirrors the profile of the sidewall 104 and may act as a part of the sidewall to support the linear product when it is installed or received. A surface of the movable clips 306 is shaped to reversibly engage with a top portion 206 of the linear product 200. In use, urging or moving the movable clip 306 in a first direction enables the movable clip 306 to engage with the top portion 206, while urging the movable clip 306 in the opposite direction may disengage the movable clip 306 from the top portion 206 thereby allowing the linear product to be removed from the support 100.

Turning to FIG. 6B, the top expanded view shows the engagement between the movable clips 306 and the top portion 206, while the bottom exploded vide of FIG. 6B shows how clip 106 engages the top portion 206. With respect to the movable clip, movement of the movable clip 306 away from the top portion causes the clip 306 to disengage from the top portion 206 of linear product 200 allowing the linear product to be removed from the support 300. In the present embodiment, two movable clips 306 are located on one side of the support 300 while two clips 106 are located on the opposite side, however in alternative embodiments, any number or relationship of movable and non-movable clips are contemplated.

Figure 7:
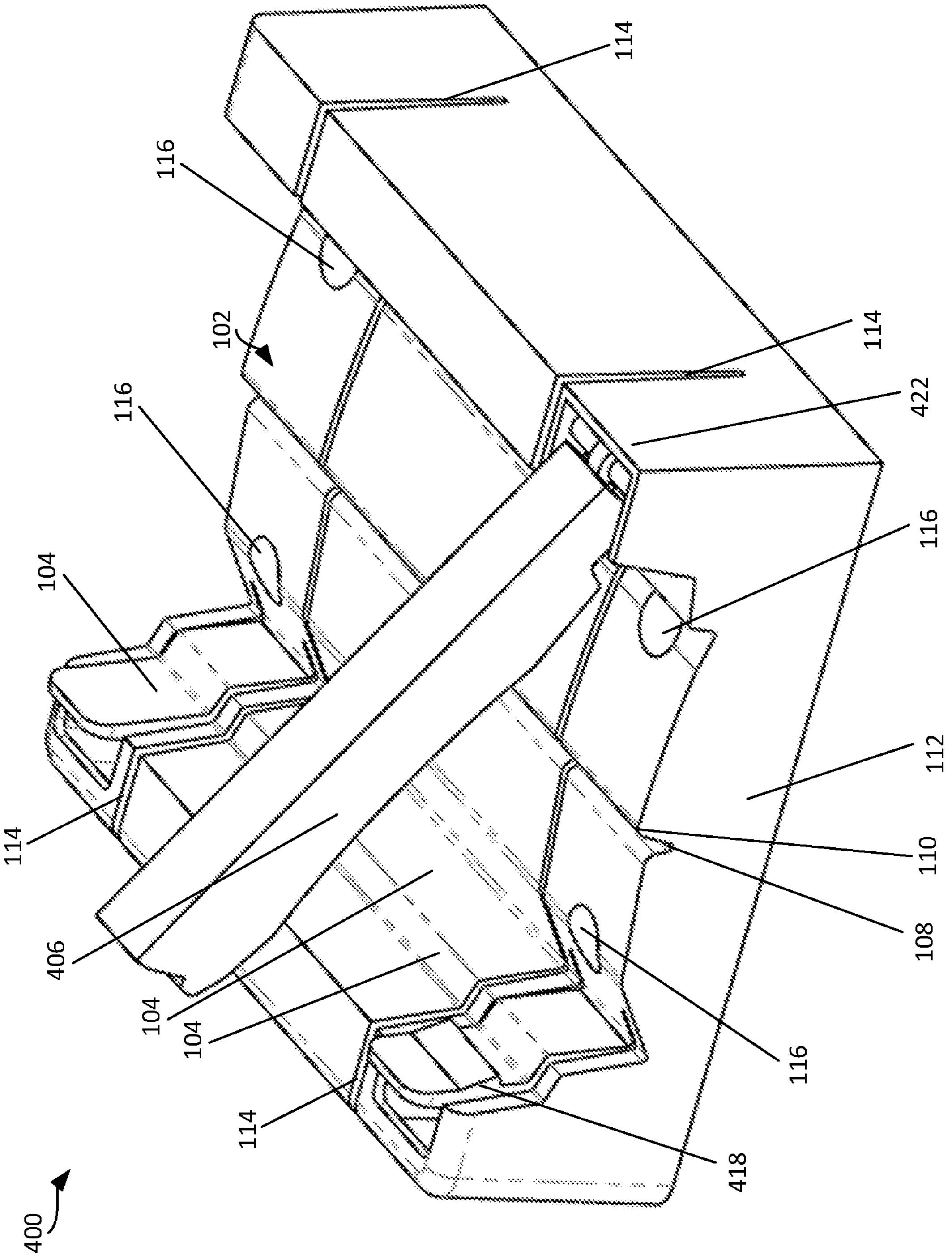
FIG. 7 is a top perspective view of a further embodiment of a support for cutting a linear product.
Figure 8B:
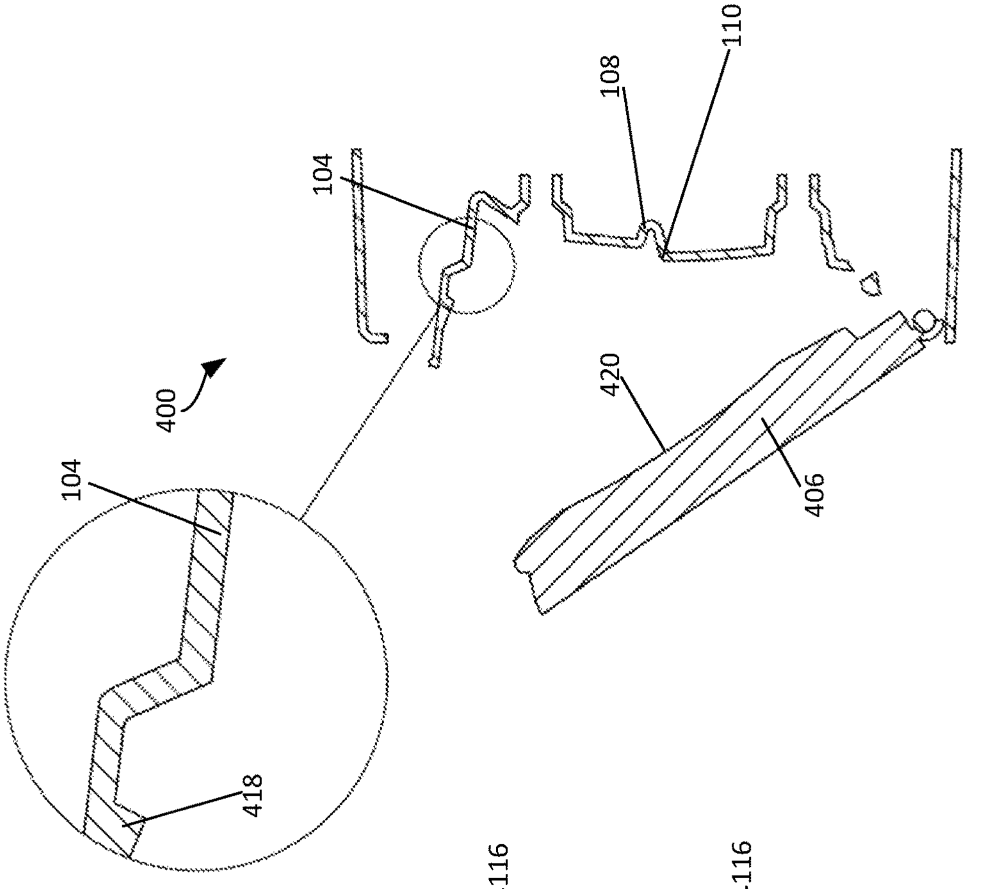
FIG. 8B is a side cross-sectional view of the support of FIG. 7 taken along line C-C of FIG. 7.
Figure 8A:
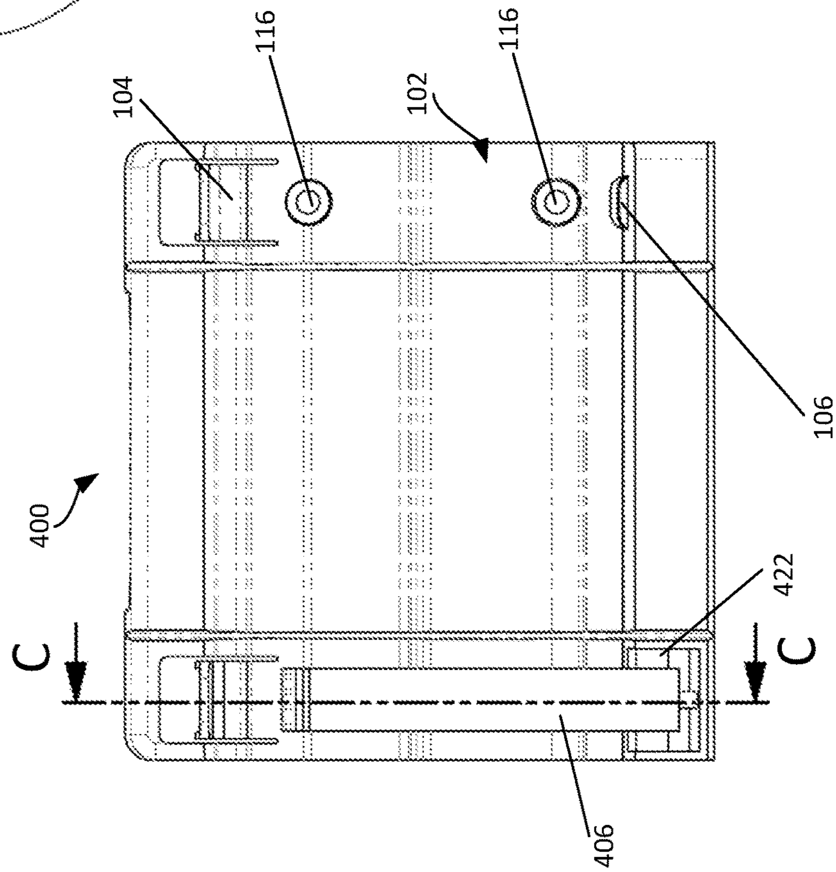
FIG. 8A is a top view of the support of FIG. 7.
Figure 9:
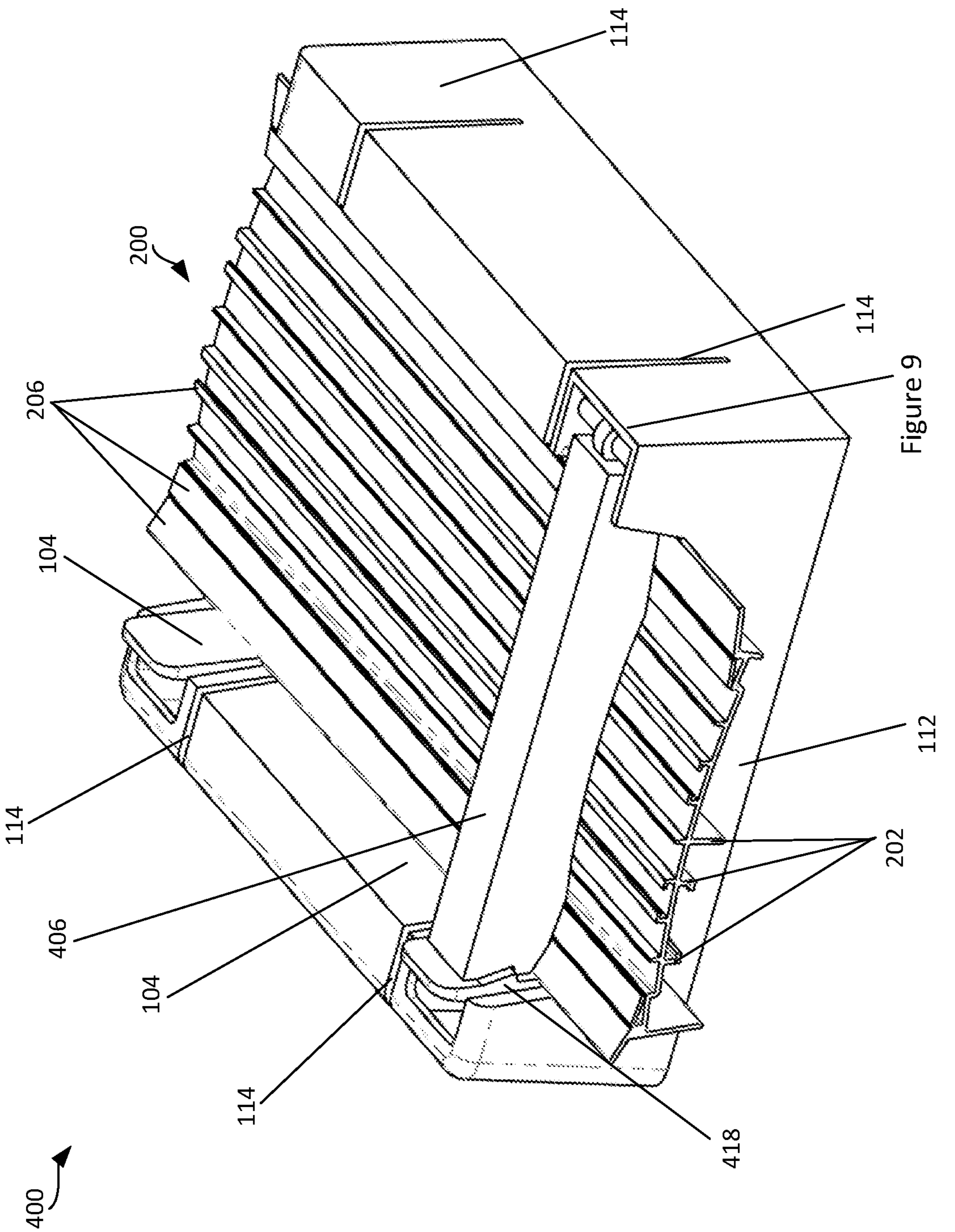
FIG. 9 is a top perspective view of the support of FIG. 7 coupled to a linear product.
Figure 10A:
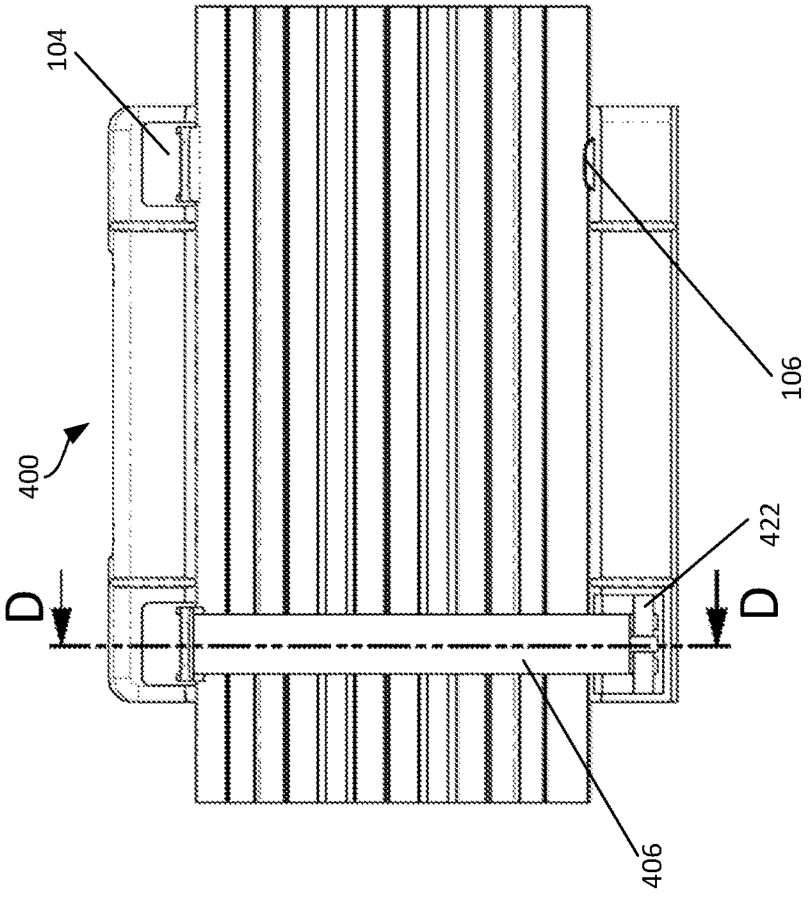
FIG. 10A is a top view of the support of FIG. 7 coupled to the linear product.
Figure 10B:
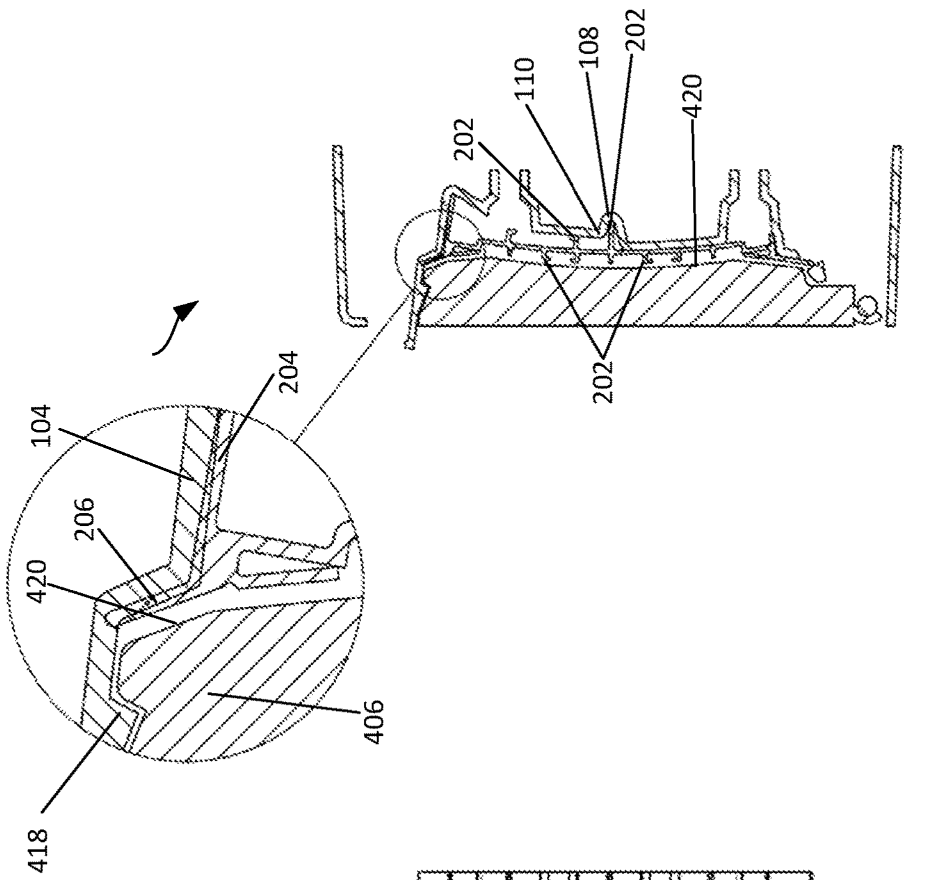
FIG. 10B is a side cross-sectional view of the support coupled to the linear product taken along line D-D of FIG. 10A.

FIG. 7 is a top perspective view of another embodiment of a support 400 for use in cutting a linear product 200. FIG. 8A is a top view of the support 400 and FIG. 8B is a side cross-sectional view of the support 400 along line C-C of FIG. 7. FIG. 9 is a top perspective view of the support 400 coupled to a linear product 200. FIG. 10A is a top view of the support 400 coupled to the linear product 200. FIG. 10B is a side cross-sectional view of the support 400 coupled to the linear product 200 along line D-D of FIG. 10A. Support 400 is similar to support 100 and/or support 300. In particular, support 400 includes a contoured top 102, a plurality of sidewalls 104, a depression 108, a protrusion 110, gaps 114 and fastening holes 116.

In the current embodiment, the support 400 includes a pair of movable clips 306 on one sidewall 104 and an integrated clip 106 on the other sidewall 104. The support 400 further includes a clamp 406 that engages with one of the movable clips 306. The movable clip 306 that engages with the clamp 406 includes a locking body 418 that is coupled to, or extends from, the contoured top 102. In one embodiment, the locking body 418 is flexible and resilient, and includes a portion having a profile that at least partially mirrors at least a portion of the sidewalls 104 and may act as a sidewall to support the linear product 200.

In the current embodiment, the clamp 406 includes a contoured bottom surface 420 (that is somewhat complementary to a top surface of the linear product) and is rotatably coupled to the sidewall 104*b*. The clamp 406 may be rotated between a first position, such as an engaged or locked position, and a second position, such as an unengaged or unlocked position. In the first position, the clamp 406 engages both the locking body 418 of the clip 306 and the top portion 206 of the linear product 200 whereby the clip may lock both the clamp 406 and the linear product 200 in place. This is shown in more detail in the expanded view of FIG. 10*b*. Engagement between the clamp 406 and the linear product occurs between the contoured bottom of the clamp 406 and the central portion of the linear product. In the second position, there is no contact between the clamp 406 and the linear product 200 such that the clamp does not block the linear product from being removed from the support 400. Disengaging the clamp 406 from the locking body 418 allows the clamp 406 to be rotated from the first position to the second position to disengage the clamp from the linear product allowing the linear product to be removed from the support 400.

In an alternative embodiment, the top portion 206 of the linear product 200 may include a mesh on its top surface. The mesh may be a metal material. The clamp 406 may engage with the mesh when the clamp 406 is in the engaged and locked position, which may reduce movement of the mesh, in particular when the mesh is being cut. Cutting of the mesh without reduced movement may cause damage to the mesh.

A skilled person, having the benefit of the present disclosure, will appreciate that a variety of linear products may benefit from the form fitting support and clamping mechanism provided by select embodiments herein to permit stability during a cutting operation.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A support for enabling cutting of a linear product, the support comprising:

a top having a profile complementary to a bottom portion of the linear product;

a pair of sidewalls extending from the top to receive the linear product;

a plurality of clips positioned within the sidewalls to engage with a top of the linear product to lock the linear product in place in a first position and to disengage with the top of the linear product in a second position; and a set of gaps within the top and the pair of sidewalls, the set of gaps shaped and dimensioned to receive at least a portion of a cutting tool.

2. The support of claim 1 wherein the plurality of clips extend from or are coupled to the top.

3. The support of claim 2, wherein at least one of the plurality of clips is movable in a direction towards and away from the linear product.

4. The support of claim 3, wherein the at least one of the plurality of clips comprises a profile that mirrors one of the pair of sidewalls.

5. The support of claim 1, wherein the linear product is an eavestrough debris guard.

6. The support of claim 1, wherein the pair of sidewalls are positioned opposite each other.

7. The support of claim 1, further comprising a clamp wherein the clamp is rotatable between an engaged position and an unengaged position for holding the linear product in place in the engaged position.

8. The support of claim 7, wherein the clamp is locked in the engaged position by one of the plurality of clips.

9. The support of claim 1, wherein the set of gaps is dimensioned to receive a blade of a manual saw.

10. The support of claim 1, wherein the top comprises at least one depression complementary to at least one extension of the linear product.

11. The support of claim 1, wherein the top comprises at least one protrusion complementary to a gap between extensions of the linear product.

12. The support of claim 1, further comprising a plurality of fastening holes passing through the top.

* * * * *